US010562392B2

(12) United States Patent
Gomez Mata et al.

(10) Patent No.: US 10,562,392 B2
(45) Date of Patent: Feb. 18, 2020

(54) FUEL TANK BAFFLE INCLUDING VERTICAL AND HORIZONTAL SURFACES FOR REDUCTION OF FUEL SLOSH NOISE

(71) Applicant: Ford Global Technologies, LLC, Dearborn, MI (US)

(72) Inventors: Francisco Javier Gomez Mata, Cuajimalpa de Morelos (MX); Mayur C. Shah, Canton, MI (US); Dhaval P. Vaishnav, Canton, MI (US); Luis Felipe Blas Martinez, Jilotepec (MX); Mike Dong, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 70 days.

(21) Appl. No.: 15/704,715

(22) Filed: Sep. 14, 2017

(65) Prior Publication Data
US 2019/0077252 A1 Mar. 14, 2019

(51) Int. Cl.
*B60K 15/077* (2006.01)
*F02M 37/00* (2006.01)
*B60K 15/03* (2006.01)

(52) U.S. Cl.
CPC ....... *B60K 15/077* (2013.01); *F02M 37/0082* (2013.01); *B60K 2015/0344* (2013.01); *B60K 2015/0775* (2013.01)

(58) Field of Classification Search
CPC .... B60K 15/00–077; B60K 2015/0775; B60K 2015/0344; F02M 37/00–0082
See application file for complete search history.

(56) References Cited

U.S. PATENT DOCUMENTS

| | | | |
|---|---|---|---|
| 6,568,556 B1 | 5/2003 | Kahler, Jr. et al. | |
| 6,736,282 B2 | 5/2004 | Krogull | |
| 7,261,323 B2 | 8/2007 | Grant | |
| 7,445,082 B2 | 11/2008 | Nakanii et al. | |
| 7,648,749 B1 | 1/2010 | Taylor | |
| 8,235,241 B2 | 8/2012 | Ramsay | |
| 8,276,779 B2 | 10/2012 | Bae | |
| 9,493,068 B2 | 11/2016 | Li et al. | |
| 9,527,633 B2* | 12/2016 | Chen | B65D 43/0254 |
| 9,926,118 B2* | 3/2018 | Guirguis | B65D 55/024 |
| 9,944,436 B2* | 4/2018 | Kalmanides | B65D 43/0237 |
| 9,981,782 B2* | 5/2018 | Kalmanides | B65D 43/0239 |
| 2001/0009257 A1 | 7/2001 | Bauer | |
| 2001/0011538 A1* | 8/2001 | Crary | B60K 15/035 |
| | | | 123/509 |
| 2003/0015537 A1 | 1/2003 | Konja | |
| 2003/0038136 A1 | 2/2003 | Bauer | |

(Continued)

FOREIGN PATENT DOCUMENTS

| | | |
|---|---|---|
| CN | 202413405 U | 9/2012 |
| EP | 2653333 A1 | 10/2013 |
| WO | 2010029103 A1 | 3/2010 |

*Primary Examiner* — Kareen K Thomas
(74) *Attorney, Agent, or Firm* — Geoffrey Brumbaugh; McCoy Russell LLP

(57) ABSTRACT

Methods and systems are provided for a baffle system of a fuel tank. In one example, a baffle system for a fuel tank may include a horizontal section and a vertical section, where the vertical section is arranged perpendicular to the horizontal section and includes a first end coupled to the horizontal section. The vertical section may be rigidly attached to a top surface of the fuel tank via an attachment interface.

20 Claims, 9 Drawing Sheets

(56) References Cited

U.S. PATENT DOCUMENTS

| | | |
|---|---|---|
| 2011/0017748 A1 | 1/2011 | Palma et al. |
| 2011/0155743 A1 | 6/2011 | Jacob et al. |
| 2011/0278305 A1 | 11/2011 | Chun |
| 2014/0144915 A1 | 5/2014 | Lee et al. |
| 2016/0096428 A1 | 4/2016 | Vaishnav et al. |
| 2018/0215517 A1* | 8/2018 | Vovan .................. B65D 55/024 |
| 2018/0273254 A1* | 9/2018 | Hansen .............. B65D 43/0235 |

* cited by examiner

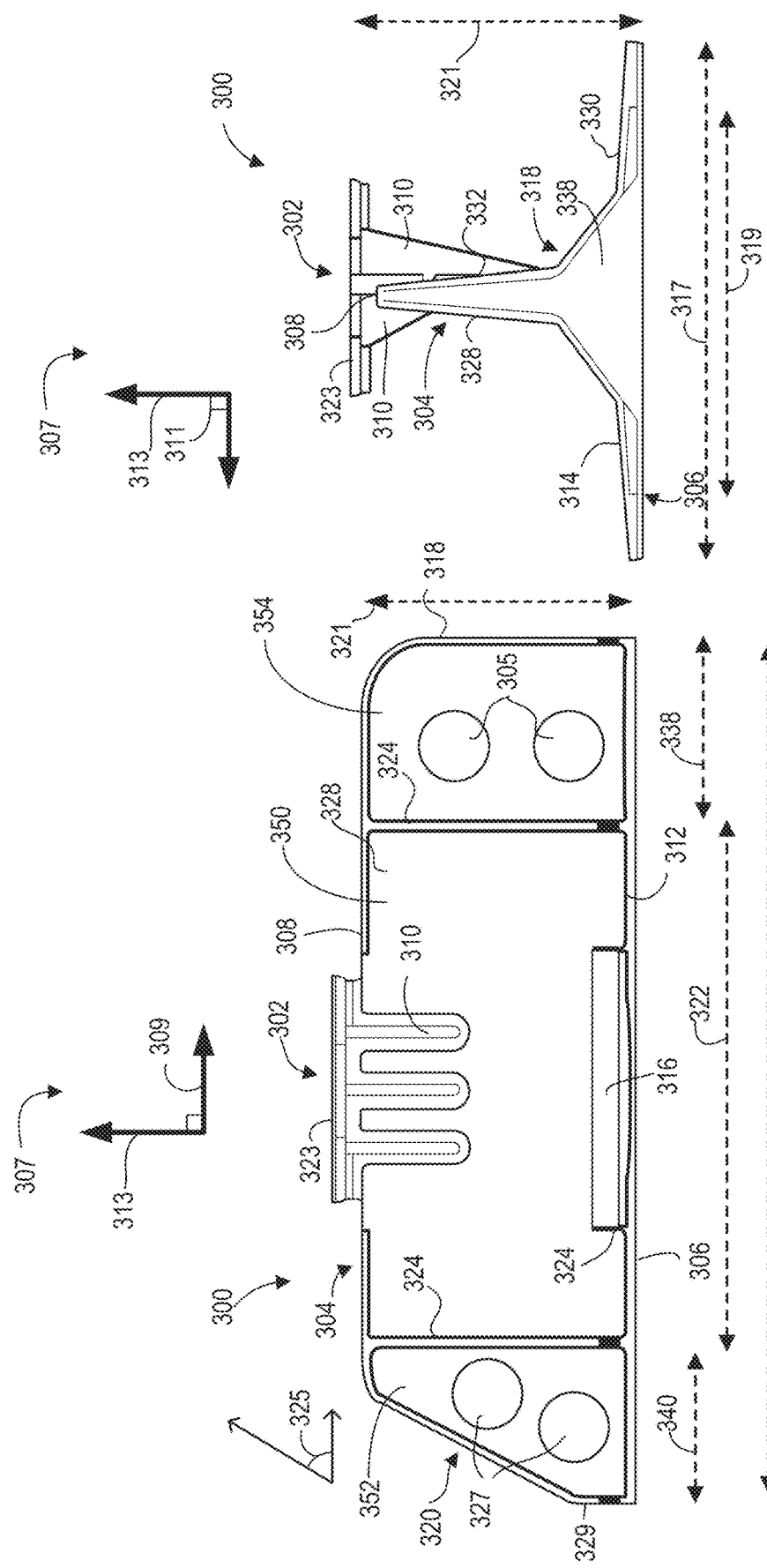

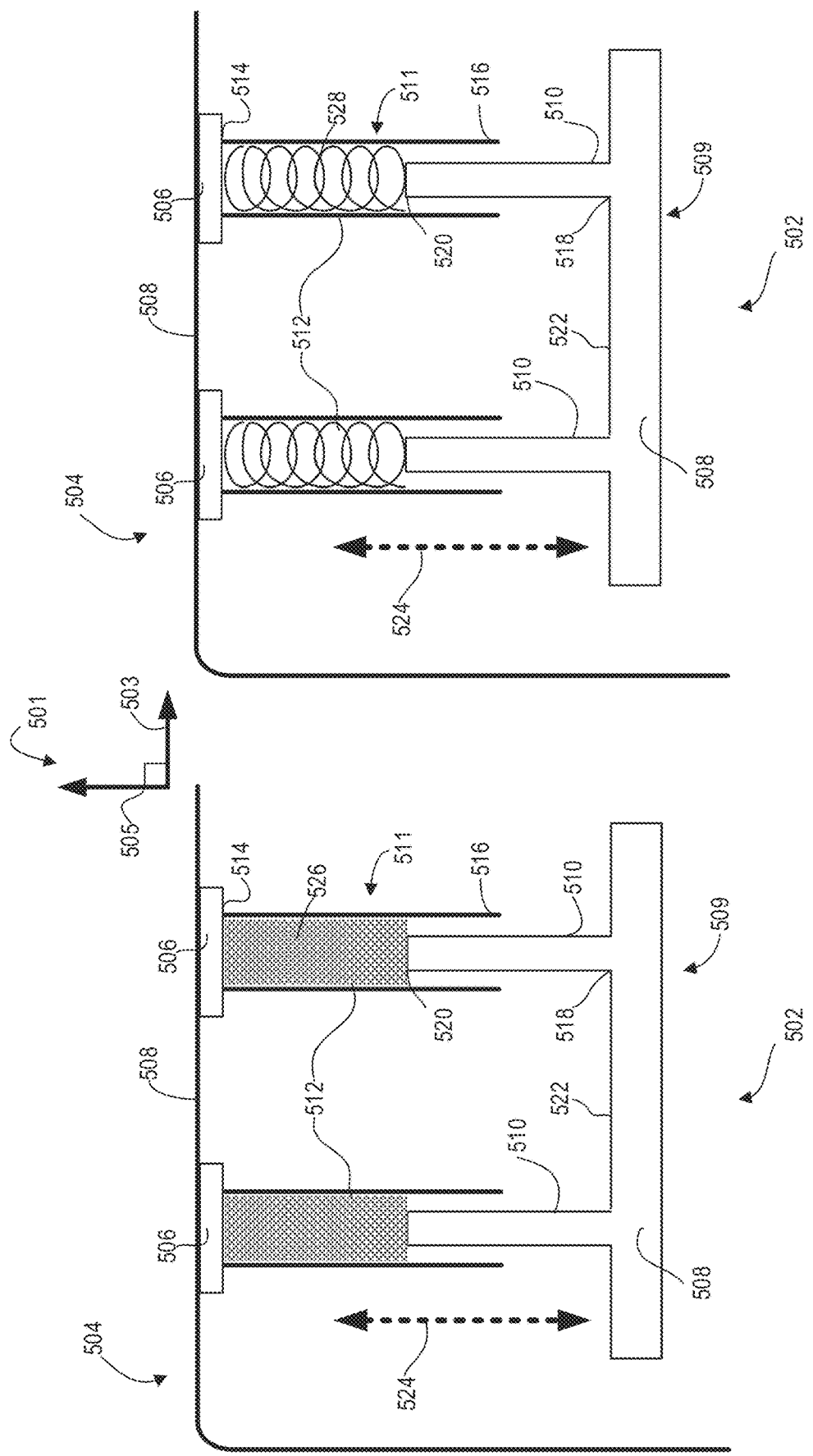

US 10,562,392 B2

FUEL TANK BAFFLE INCLUDING VERTICAL AND HORIZONTAL SURFACES FOR REDUCTION OF FUEL SLOSH NOISE

FIELD

The present description relates generally to methods and systems for reducing audible vibrations caused by fuel movement in onboard vehicular tanks.

BACKGROUND/SUMMARY

Fuel slosh occurs when a vehicle with a fully or partially filled fuel tank accelerates, decelerates or executes a sharp turn. In response, liquid waves develop and collide and splash on the tank surface causing vibrations to develop in the fuel tank. Specifically, whenever a travelling liquid wave approaches a tank surface, it collides with vertical walls (front or rear) of the fuel tank and then climbs up and collides with a ceiling (e.g., top wall) of the fuel tank. Such vibrations generate air borne and structure based noises that are audible to a vehicle driver and occupants. Slosh noise is particularly problematic for hybrid and start-stop vehicles since periods exist in the drive cycle where background engine noise is absent. Wave impacts with the ceiling of the fuel tank, in particular, may create increased noise.

Other attempts to address fuel slosh noise include systems with multi-piece, complex baffle systems or baffles that are vertically oriented. One example approach is shown by Vaishnav et al. in U.S. patent application no. 2016/0096428. Therein, a baffle is mounted vertically within a fuel tank and faces of the baffle are arranged vertically within the fuel tank (e.g., perpendicular to the ground on which the vehicle sits).

However, the inventors herein have recognized potential issues with such systems. As one example, vertical baffle systems may not sufficiently reduce fuel slosh noise in the fuel tank. Specifically, such vertical baffle systems may not sufficiently retard the vertical motion of the liquid adjacent to walls of the fuel tank, and thus may not sufficiently reduce a wave amplitude of the liquid. As a result, fuel slosh noise may still be audible to the vehicle driver and occupants. Additionally, multi-piece baffle systems with complex parts may be difficult and costly to manufacture, and may take up significant space within the fuel tank.

In one example, the issues described above may be addressed by a baffle system for a fuel tank, comprising: a horizontal section; a vertical section arranged perpendicular to the horizontal section and including a first end coupled to the horizontal section, the vertical section extending across a length of the horizontal section; and an attachment surface coupled to a second end of the vertical section and including a plurality of apertures adapted to couple the baffle system to a top surface of the fuel tank. The baffle system may be installed in a fuel tank of a vehicle, the fuel tank having the top surface and a bottom surface arranged opposite and vertically below the bottom surface relative to the ground on which the vehicle sits. The horizontal section of the baffle system may be positioned vertically above and spaced away from the bottom surface of the fuel tank. Thus, in some instances the horizontal section may be positioned above a liquid fill level (e.g., fluid level) of the fuel tank. The horizontal section of the baffle system may retard the vertical motion of the liquid (e.g., fuel) within the fuel tank that is adjacent to tank walls of the fuel tank, thereby suppressing a wave amplitude of the fuel slosh wave within the fuel tank. Under certain driving conditions and fill levels, the fuel slosh waves may rise above horizontal section. During these conditions, the vertical section of the baffle system may provide secondary fuel slosh mitigation. In this way, the baffle system including the vertical and horizontal section may reduce the impact of the fuel slosh wave with the top surface (e.g., ceiling) of the fuel tank. As a result, fuel slosh noise may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-3C depict an embodiment of a baffle system for a fuel including vertical and horizontal baffle sections.

FIGS. 5A-5B show example embodiments of a baffle system with a sliding connection between the vertical and horizontal baffle sections.

FIGS. 2A-3C are shown approximately to scale.

DETAILED DESCRIPTION

Figure 1:
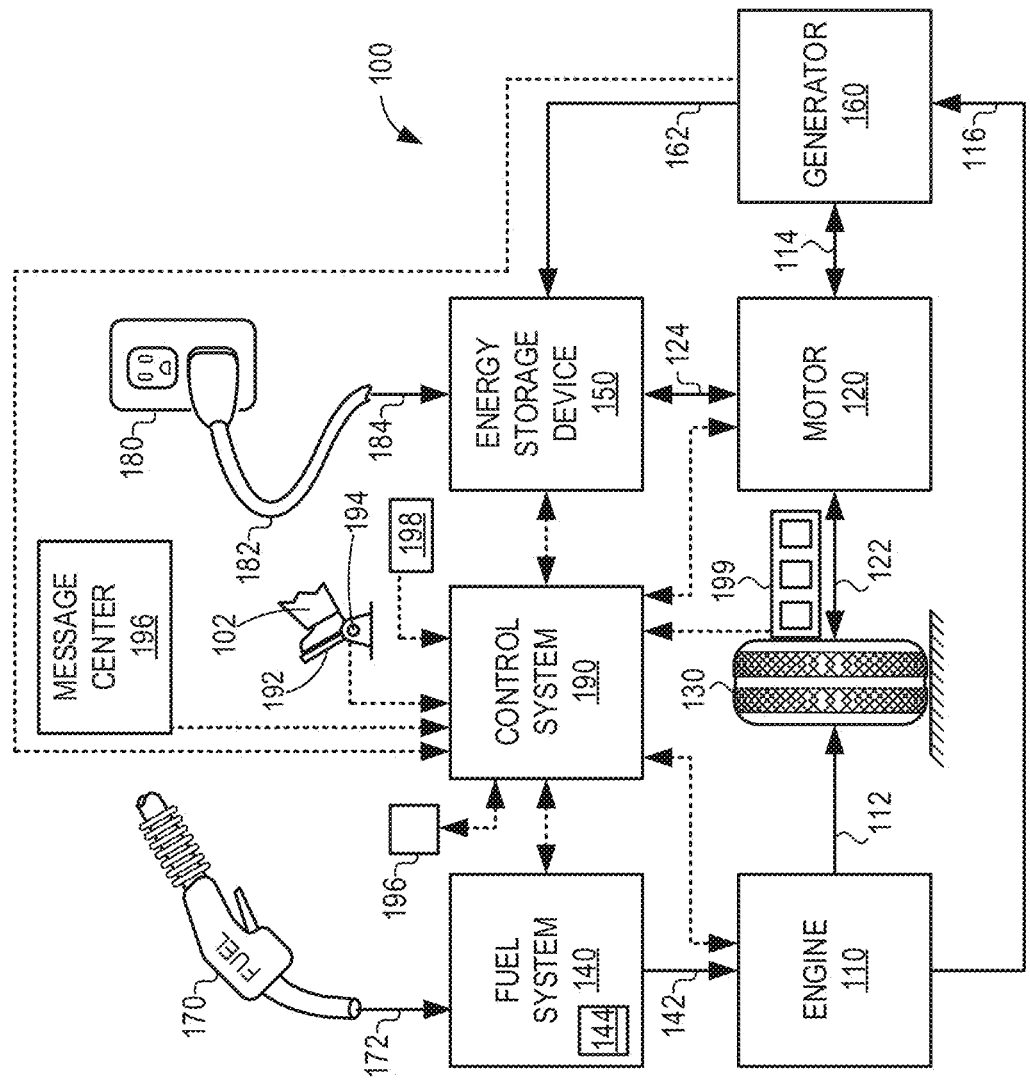
FIG. 1 illustrates an example hybrid vehicle propulsion system including a fuel system with a fuel tank.
Figure 2A:
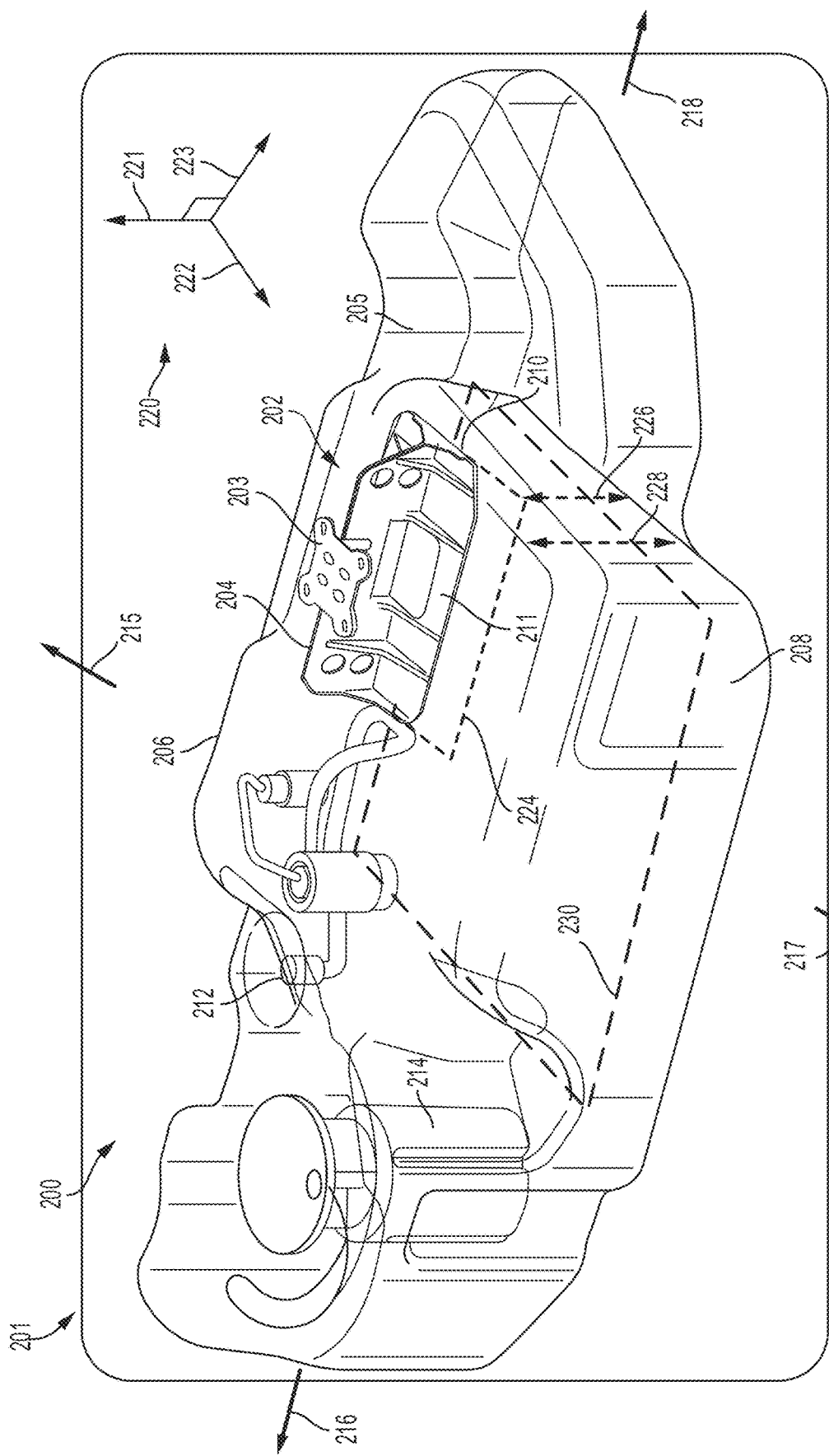
FIGS. 2A-2B illustrate an example fuel tank with a baffle system for reducing fuel slosh noise.
Figure 2B:
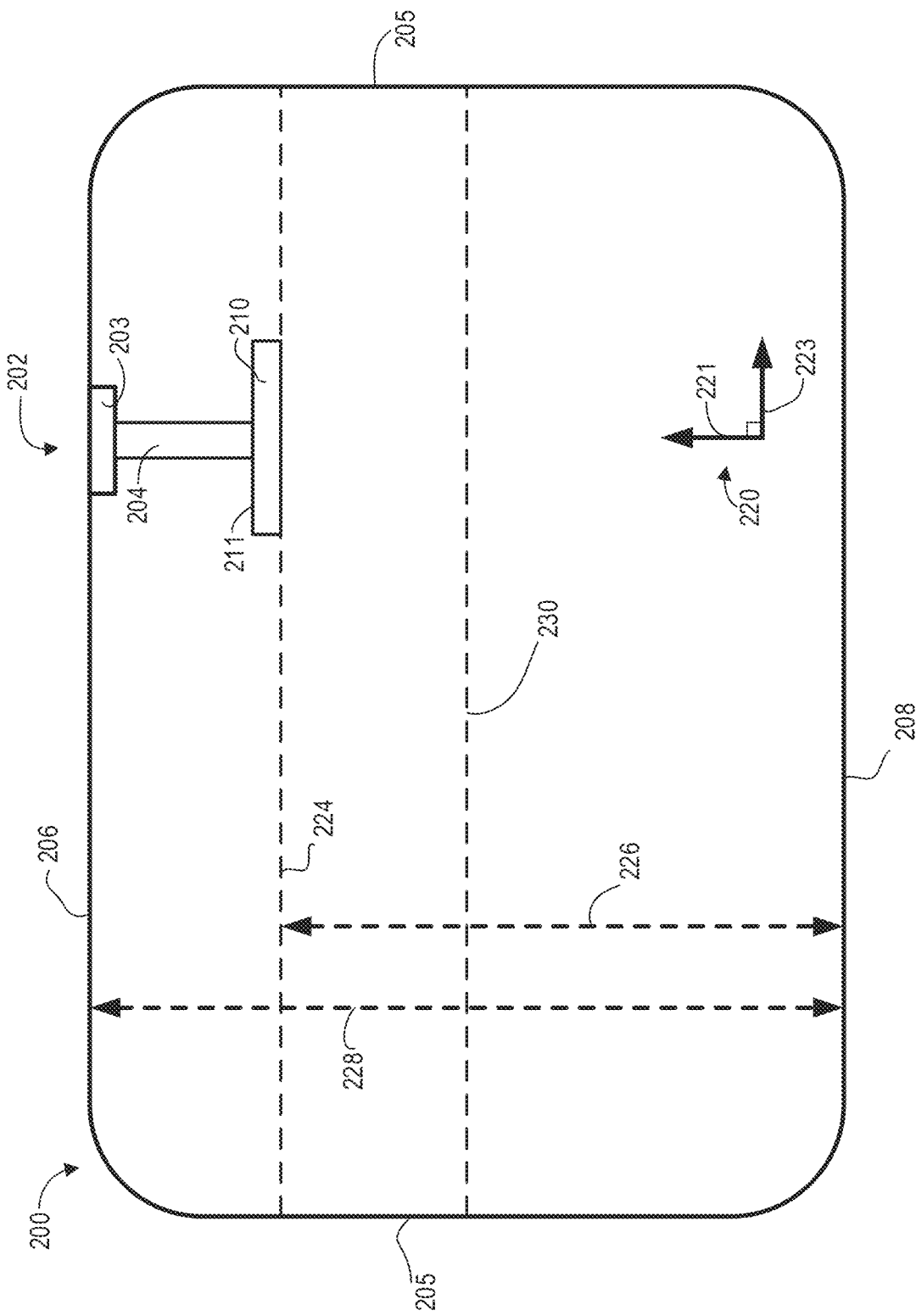
Figure 3A:
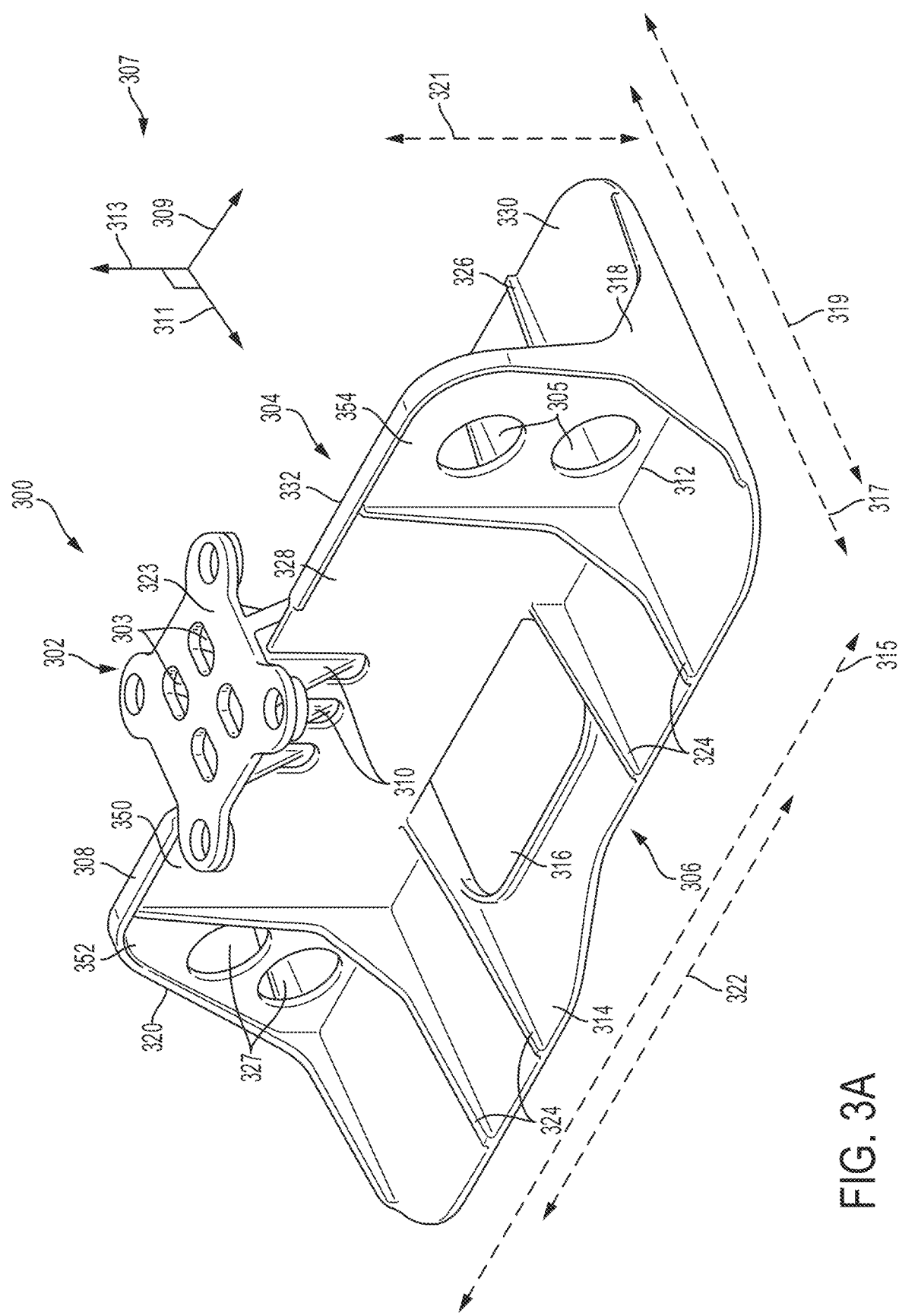
Figure 4:
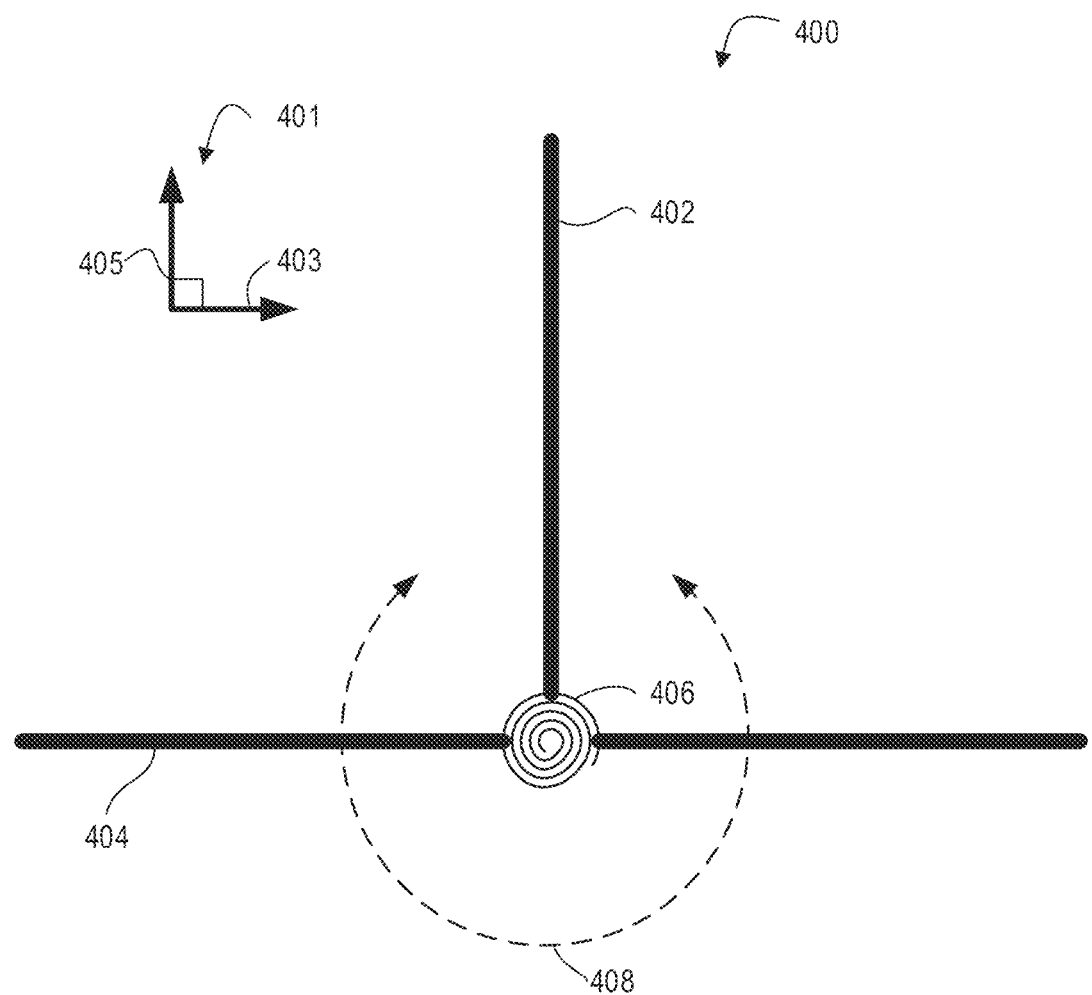
FIG. 4 depicts another embodiment of the baffle system with a hinged joint between the vertical and horizontal baffle sections.
Figures 6A, 6B:
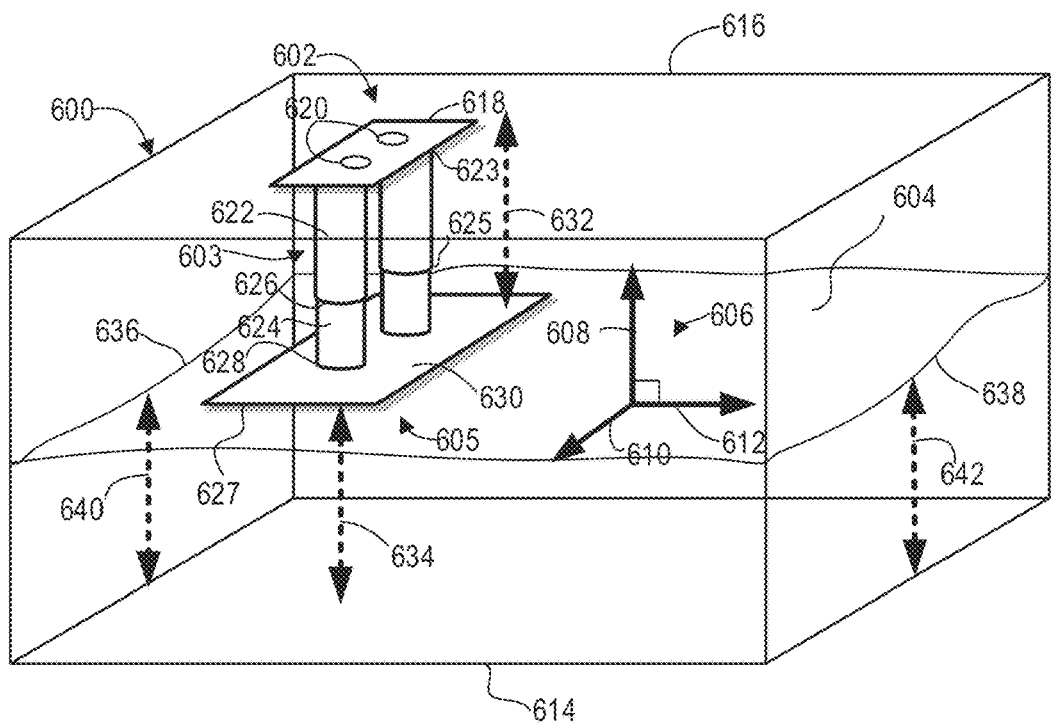
FIGS. 6A-6B depict an embodiment of the baffle system with a sliding connection between the vertical and horizontal baffle sections in a fuel tank to illustrate the direction of sliding based on a fuel surface.
Figure 7:
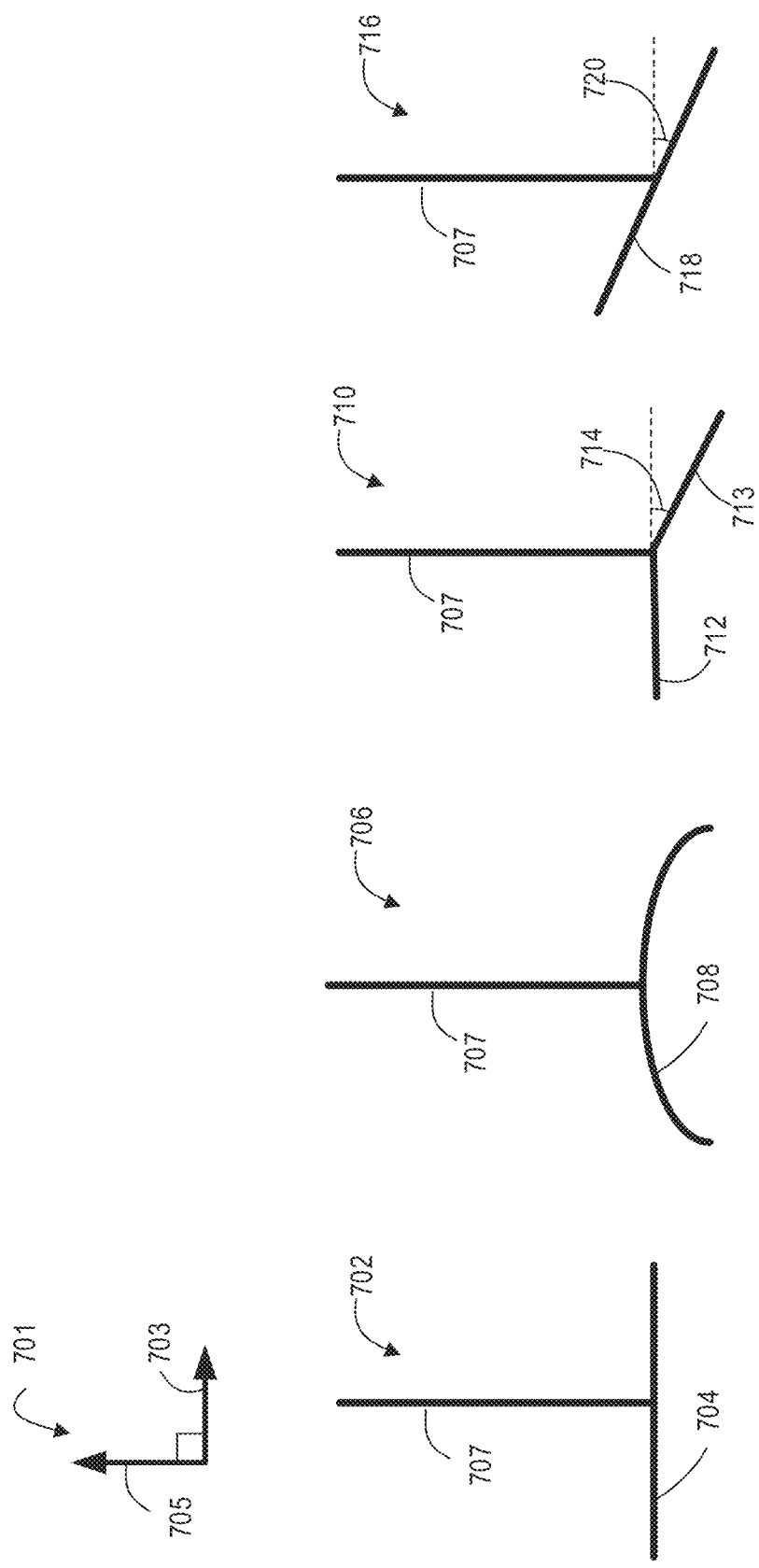
FIG. 7 illustrates embodiments of the baffle system showing different geometries of the horizontal section.

The following description relates to systems and methods for a baffle system of a fuel tank for reducing audible vibrations (e.g., slosh noise) caused by the movement of fuel in a vehicle fuel tank, such as the fuel tank of a hybrid and/or start-stop vehicle. Although the slosh noise may be more pronounced in hybrid and/or start-stop vehicles, a baffle system according to the present description is not limited to such vehicles. Rather, the baffle system described herein may be implemented on a plurality of different types of vehicles and/or into automobile fuel tanks of different styles and shapes. For simplicity of description, FIG. 1 shows a schematic engine diagram of a hybrid electric vehicle that includes a fuel tank that may include the baffle system. Then, FIGS. 2A-2B illustrate an example automotive fuel tank that may be the fuel tank of FIG. 1 which includes a baffle system including a vertical and horizontal section (referred to herein as a wave surge attenuator) positioned within the fuel tank. The vertical positioning of the wave surge attenuator, with respect to the ground on which the vehicle in which the fuel tank is installed sits, may limit the vertical range of the effective operating height of the system, relative to the inner vertical height of the fuel tank. FIG. 3A depicts a detailed perspective view of the wave surge attenuator showing the coupling between the vertical and horizontal baffle sections and the coupling between the vertical baffle section and a top attachment piece. As shown in FIGS. 3A-3B, the wave surge attenuator may include a plurality of apertures in the vertical baffle section, a plurality of ribs extending across each of the horizontal and vertical baffle sections, and a central aperture in the plane of the horizontal baffle section. FIGS. 3B and 3C show front and side views of the wave surge attenuator of FIGS. 3A-3C. FIG. 4 shows a schematic depiction of an embodiment of the wave surge attenuator with a hinged joint coupling the vertical section to the horizontal section and the allowed direction of movement in the horizontal plane. FIGS. 5A and 5B show variations of coupling between the vertical and horizontal baffle sections wherein a sliding attachment is adapted to allow vertical movement of the horizontal section relative to the vertical section and FIGS. 6A and 6B illustrate this adaptation relative to a fluid surface within the fuel tank. Different embodiments of the wave surge attenuator are given in FIG. 7, illustrating possible geometries encompassed by the functionality of the device with respect to the arrangement of the horizontal section relative to the vertical section. In this way, a wave surge attenuator (or baffle system) including horizontal and vertical sections arranged perpendicular to one another, where the vertical section is attached to a top surface (e.g., ceiling) of a fuel tank, may be used to reduce the wave amplitude of fuel slosh waves within the fuel tank, thereby reducing fuel slosh noise audible to a vehicle driver and occupants.

FIGS. 2A-6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated. As described herein, the vehicle may be operated at a lower noise level during these periods, which renders fuel slosh noise problematic since hybrid and start-stop vehicles are often operated with periods in the drive cycle where background engine noise is absent.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may also be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160. As described herein, fuel tank 144 is configured with a baffle system for reducing slosh noise during driving.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196. As described herein, engine 110 may be periodically set to a deactivated state where the consumption of fuel at the engine is significantly reduced or discontinued. Where engine 110 is deactivated for extended periods of time, the fuel stored at fuel tank 144 may take a longer time to be depleted by the engine.

FIGS. 2A-2B illustrate an example fuel tank 200, such as fuel tank 144 in FIG. 1, which is included in a vehicle 201, comprising a first embodiment of a baffle system 202 (henceforth named a wave surge attenuator) including a vertical section 204 that is arranged perpendicular to an inside bottom surface 208 of fuel tank 200 and rigidly coupled at a first end to an attachment surface 203. FIG. 2A shows a first, isometric view of fuel tank 200 while FIG. 2B shows a more schematic, side view of fuel tank 200. An axis system 220 is depicted to illustrate the orientation of elements within fuel tank 200 where 222, 221, and 223 depict the horizontal, vertical, and lateral directions (e.g., axes), respectively. The vertical direction 221 may be relative to a surface on which the vehicle 201 sits. The attachment surface 203 is in face-sharing contact with an inner, top surface 206 of fuel tank 200. The top surface 206 is arranged in a plane formed by horizontal direction 222 and lateral direction 223, and arranged parallel to the inside bottom surface 208 of fuel tank 200. The vertical section is aligned along the vertical direction 221. A horizontal section 210 is coupled to a second end of the vertical section 204. The horizontal section is aligned in the plane formed by horizontal direction 222 and lateral direction 223 and is arranged parallel to and spaced away from (e.g., not touching any part of) the inner bottom surface 208. In this way, the vertical section 204 and horizontal section 210 are arranged perpendicular to one another. Fuel tank 200 is shown in FIG. 2A with a refueling port 212 for receiving fuel via a pipe, also known as a fill-pipe which receives fuel from a device, such as fuel dispensing device 170 shown in FIG. 1. Fuel delivery module 214 may also be included for delivering fuel to engine 200 via a system, such as fuel system 140 shown in FIG. 1.

The elements of fuel tank 200 in FIG. 2A can be described in the direction of fuel flow through the fuel tank 200 and any element in the path of fuel flow (e. g., which may be a blend of gasoline and ethanol, a blend of gasoline and methanol, or other fuels and fuel blends) relative to a reference point is considered downstream of the reference point. Conversely any element positioned in the reverse direction of fuel flow relative to a reference point is upstream of the reference point. Furthermore, the elements of fuel tank 200 can be described in the orientation relative to the front and rear ends of vehicle 201. The front end of vehicle 201 can be described in the direction indicated by an arrow 215 and the rear end of vehicle indicated by an arrow 217. Similarly, the left side, or driver side of the vehicle can be described in the direction indicated by an arrow 216 and the right side, or passenger side, indicated by an arrow 218. In this way, one example of fuel tank 200 may include wave surge attenuator 202 arranged in fuel tank 200 adjacent to a front-facing wall, e.g. the wall closest to the front of vehicle 201, as shown in FIG. 2A, and aligned parallel to the plane formed by vertical direction 221 and lateral direction 223. In an alternate embodiment, wave surge attenuator 202 may be mounted closer to rear-facing wall of fuel tank 200, e.g. the wall of fuel tank 200 closest to the rear end of vehicle 201 wherein the geometry and internal packaging space of the fuel tank determines the positioning of the wave surge attenuator.

As vehicle 201 navigates terrain, fuel stored within fuel tank 200 may undergo various motions that cause vibrations and noise due to transient flow. Liquid (e.g., fuel) wave motions may include movement along the lateral direction 223 of fuel tank 200, parallel to the planar surface of the vertical section 204 of wave surge attenuator 202. Liquid motions may also include wave motions along a transverse axis in the direction of horizontal direction 222 of the fuel tank, perpendicular to the planar surface of the vertical section 204 of wave surge attenuator 202, and/or circular flows, or eddies, that develop during a sharp turn. Furthermore, wave motion of fluid within the fuel tank may also include changes in wave height resulting from waves travelling along the longitudinal or transverse axis and colliding with the vertical inner walls 205 of fuel tank 200. Collision with the vertical inner tank walls may then be followed by collision with the inner top surface (e.g., ceiling) 206 of fuel tank 200 (e.g., surge).

In one example, the exemplary vehicle 201 is a hybrid-electric vehicle. Thus, the system comprises a hybrid-electric vehicle powertrain including an engine along with a fuel storage tank for storing engine fuel on-board the vehicle, according to the present description. That is, the fuel storage tank includes a baffle system in FIG. 2A (e.g., wave surge attenuator 202) including vertical section 204 rigidly coupled at the first end to attachment surface 203 that is directly coupled to the inner top surface 206 of fuel tank 200 via a plurality of mounting apertures from the planar surface of attachment surface 203. The plane formed by vertical direction 221 and lateral direction 223 describes the plane of the vertical section 204 of the baffle system which is perpendicular to the inner bottom surface 208 of fuel tank 200, inner top surface 206, and attachment surface 203. Similarly, the plane formed by horizontal direction 222 and lateral direction 223 describes the plane of the horizontal section 210 which is coupled at a top face 211 to the second end of vertical section 204. The vertical section 204 is centered along a width of the horizontal section 210, the width arranged perpendicular to a length of the horizontal section 210, the length arranged along the lateral direction 223 and the width arranged along the horizontal direction 222. The plane formed by the horizontal direction 222 and lateral direction 223, equal to the plane of horizontal section 210, is parallel to the inner bottom surface 208 of fuel tank 200, inner top surface 206, and attachment surface 203. In an alternative embodiment, vertical section 204 may not be centered and instead be mounted at a different point along the width of horizontal section 210 and the width of vertical section 204, measured along the lateral direction 223, may or may not be equal to the length of horizontal section 210, also measured along the lateral direction 223.

The baffle system described above has a baffle height defined by a height of vertical section 204 and by an amount that arranges horizontal section 210 in a range of 70-90% of a total height of fuel tank 200. For example, in FIG. 2B, plane 224 which is parallel to the plane formed by 222 and 223, depicts the height of the bottom surface of horizontal section 210 relative to inner bottom surface 208, illustrated by arrow 226, parallel to the vertical direction 221, where arrow 226 represents 70-90% of the total inner volume height of fuel tank 200, given by arrow 228. Additionally, the bottom surface of horizontal section 210 is positioned in the vertical direction 221, above a 50% fill level 230 of fuel tank 200 where the 50% fill level 230 is situated between inner top surface 206 and inner bottom surface 208.

FIGS. 3A-3C depict different views of a wave surge attenuator 300 which may be used as wave surge attenuator 202 of FIG. 2A, comprising a baffle system including an attachment surface 302, a vertical section 304, and a horizontal section 306. FIG. 3A shows a perspective view of the wave surge attenuator 300, while FIG. 3B shows a front view and FIG. 3C shows a side view of the wave surge attenuator 300. An axis system 307 is depicted to illustrate the orientation of elements of wave surge attenuator 300 wherein the axis system includes a horizontal axis (e.g., direction) 311, vertical axis 313, and lateral axis 309. The vertical axis 313 may be in a vertical direction, relative to a surface on which a vehicle in which a fuel tank in which the wave surge attenuator is installed sits. Vertical axis 313 may correspond to vertical direction 221 shown in FIGS. 2A-2B. In this way, discussion of components being arranged vertically above/below other components may be relative to the vertical axis 313.

As shown in FIGS. 3A-3C, the wave surge attenuator 300 has a length 315 arranged in a direction of lateral axis 309, an outer width 317 and inner width 319 each arranged in a direction of horizontal axis 311, and height 321 arranged in a direction of vertical axis 313. However, in alternate embodiments, the outer width 317 and inner width 319 may be the same or different, depending upon tank design. The outer width 317, inner width 319, and length 315 may be an outer width, inner width and length of the horizontal section 306 whereas the height 321 may be a height of the vertical section 304.

The attachment surface 302 includes a planar surface 323 arranged in a plane formed by horizontal axis 311 and lateral axis 309, the planar surface 323 arranged perpendicular to vertical section 304. The attachment surface 302 is directly coupled to a first end 308 of the vertical section 304 via a plurality of legs 310 extending from a bottom of the planar surface 323. The plurality of legs 310 are directly coupled to side surfaces, on either side of vertical section 304. The attachment surface 302 is rigidly coupled to the first end 308 of the vertical section 304 via the plurality of legs 310. The attachment surface 302 includes a plurality of apertures 303 arranged in the planar surface 323. The plurality of apertures 303 are adapted to couple the attachment surface 302 to the inner top surface of a fuel tank, such as top surface 206 shown in FIGS. 2A-2B. Thus, the vertical section 304 may be rigidly fixed to the top surface of the fuel tank via the attachment surface 302.

As shown in FIGS. 3A and 3B, a planar portion of a first outer edge 318 of vertical section 304 is arranged normal to the lateral axis 309. In contrast, a second outer edge 320 of vertical section 304 is sloped (e.g., angled) relative to the lateral axis 309. For example, as seen in FIG. 3B, the second outer edge 320 may form an angle 325 that is less than 90 degrees with a planar face of the horizontal section 306, in the direction of lateral axis 309. The top of second outer edge 320 is separated by a shorter distance, in the direction of lateral axis 309, from the top of first outer edge 318 than the distance between the bottom of second outer edge 320 to the bottom of first outer edge 318. As seen in FIGS. 3A and 3C, when viewed from the plane formed by horizontal axis 311 and vertical axis 313, first and second outer edges 318 and 320 are widest at the mating between vertical section 304 and horizontal section 306. Each of the first outer edge 318 and the second outer edge 320 then narrow toward the first end 308 (e.g., top) of vertical section 304, in a direction of vertical axis 313.

As shown in FIG. 3B, the intersection of the first end 308 of vertical section 304 and first outer edge 318 is curved in the plane formed by vertical axis 313 and lateral axis 309. At the intersection of the second outer edge 320 of vertical section 304 and first end 308, the mating is also curved. The coupling of first end 308 with second outer edge 320 is arranged at the top end of the portion of second outer edge 320 that is sloped, as described above, relative to the lateral axis 309. A bottom portion 329 of second outer edge 320 connects to the sloped portion but is arranged normal to the lateral axis 309 and intersects perpendicularly with second edge 312 of vertical section 304.

As seen in FIGS. 3A and 3B, vertical section 304 includes a plurality of apertures 305 and 327 extending through a wall of vertical section 304. The apertures 305 and 327 are arranged at a plurality of outer ends 352 and 354 of vertical section 304, the outer ends being on either side of a central portion 350 in the lateral direction 309, with a first set of apertures 305 arranged within outer end 354 and proximate to first outer edge 318 of vertical section 304 and a second set of apertures 327 arranged within outer end 352 and proximate to the second outer edge 320 of vertical section 304. The first set of apertures 305 are stacked vertically and linearly above and below one another, in the direction of vertical axis 313, between the first end 308 and second end 312 of vertical section 304. The second set of apertures 327 are positioned vertically above and below one another, but with an offset such that they are not stacked directly above and below one another. The second set of apertures 327 are separated from the first set of apertures 305 by the central portion 350 of the vertical section 304, the central portion 350 having a length 322 aligned in the direction of lateral axis 309. FIG. 3B shows a first length 340 of the outer end 352, a second length 338 of the outer end 354, and a third length 322 of the central portion 350.

As explained above, the vertical section 304 includes the first end 308 coupled to the attachment surface 302 and a second end 312 coupled directly to the horizontal section 306. The height 321 is defined between the first end 308 and second end 312. The second end 312 of vertical section 304 is centered along the width 315 of a top surface 314 of horizontal section 306 and, in the example shown in FIGS. 3A-3C, rigidly couples to horizontal section 306 so that the baffle system comprising horizontal section 306 and vertical section 304 is formed as a single piece. However, in an alternate embodiment, the second end 312 of vertical section 304 may not be centered along the width 315 of the horizontal section 306. Instead, the second end 312 of vertical section 304 may be arranged closer to one side of top surface 314 of the horizontal section 305 than the other. In alternate examples, the horizontal section 306 and vertical section 304 may be rigidly fixed to one another via one or more fixation elements (such as screws, bolts, brackets, etc.). In yet another example, as shown in FIGS. 4-6B and discussed further below, the horizontal section 306 and vertical section 304 may not be rigidly fixed to one another and instead be coupled to one another via one or more flexible elements. As shown in FIGS. 3A-3C, the vertical section 304 is arranged perpendicular to the horizontal section 306. Additionally, the vertical section 304 extends across the length 315 of horizontal section 306, where the first outer edge 318 forms a first outer edge of the horizontal section 306 and the second outer edge 320 forms a second outer edge of the horizontal section 306. As seen in FIGS. 3A-3C, a central aperture 316 is included in horizontal section 306. The central aperture is approximately centered along the length 315 and inner width 319 and extends through an entirety of the horizontal section, in the direction of vertical axis 313. Vertical section 304 is approximately centered over the central aperture 316, in the direction of horizontal axis 311. Central aperture 316 is positioned directly below attachment surface 302, in the direction of vertical axis 313, and is at least as wide as the attachment surface 302 in the direction of horizontal axis 311 and at least as long as the attachment surface 302 in the direction of lateral axis 309. As a result, the central aperture 316 may allow a fixation tool access to the attachment surface 302 (via an underside of the horizontal section 306) in order to fix the attachment surface 302 to the top surface of the fuel tank via the plurality of mounting apertures 303.

The wave surge attenuator 300 further comprises a plurality of ribs 324 and 326 extending in the direction of horizontal axis 311 along the widths 317 and 319 of the horizontal section 306 and in the direction of vertical axis 313 along the height of the vertical section 304. Each rib of the ribs 324 and 326 extend between the horizontal section 306 and vertical section 304. A first set of ribs 324 extends from the first surface 328 of vertical section 304 to the first surface 314 of horizontal section 306 and a second set of ribs 326 extends from a second surface 332 of vertical section 304 to a second surface 330 of horizontal section 306. The first surface 328 and second surface 332 of vertical section 304 are arranged on opposite sides of the vertical section from one another and the first surface 314 and second surface 330 of horizontal section 306 are part of a same, top surface of horizontal section 306, being separated from one another by vertical section 304. Each of ribs 324 and 326 is relatively uniform in thickness in the direction of lateral axis 309. However, in the plane defined by the vertical axis 313 and the horizontal axis 311, each of the ribs 324 and 326 are thickest at a mating interface (e.g., at second end 312) between the horizontal section 306 and vertical section 304. For example, rib 324 extends outward from first surface 328, in the direction of horizontal axis 311, and increases in thickness in the direction of the width 317 or 319 (e.g., the amount it extends outward) as the rib gets closer to the interface between the horizontal section 306 and vertical section 304. Rib 324 also extends outward from top surface 314, in the direction of vertical axis 313, and increases in thickness in the direction of the height 321 (e.g., the amount it extends outward) as the rib gets closer to the interface between the horizontal section 306 and vertical section 304.

In alternative embodiments of wave surge attenuator 300, other arrangements of the plurality of ribs 324 and 326 may be possible including, and not limited to, the presence or lack thereof of ribs, as well as the number of ribs. Additional embodiments may comprise variations in the spatial positioning of the ribs, e.g. how much space separates the ribs from one another, the positioning of ribs on opposite faces of vertical section 304 relative to one another, and the thickness and uniformity of the ribs. Additionally, in some embodiments, the ribs may not extend all the way to the outer edges of the vertical and horizontal sections (in contrast to the ribs shown in FIG. 3A, for example). As introduced above, FIG. 3B shows a front view of wave surge attenuator 300 in the plane formed by vertical axis 313 and lateral axis 309. As seen in FIG. 3B, the central aperture 316 extends into and is included in vertical section 304 which is visible as an extension in the direction of vertical axis 313 of the horizontal (e.g. in the direction of horizontal axis 311) part of central aperture 316 included in horizontal section 410. The vertical extension of central aperture 316 is centered within the central portion 322 of vertical section 304 in the direction of lateral axis 309.

FIG. 3C shows a side view of the outer edge 318 of vertical section 304 which includes a planar surface 338 in the plane formed by vertical axis 313 and horizontal axis 311. Planar surface 337 is widest at the intersection of vertical section 304 and horizontal section 306 in the directions of both vertical axis 313 and horizontal axis 306. For example, the width of planar surface 338 increases from the first edge 308 towards the second edge 312 (such as the second edge 312 in FIG. 3B) along vertical axis 313. Planar surface 338 also extends in the direction of horizontal axis 311 and increases in this direction as the surface gets closer to the interface between the horizontal section 306 and vertical section 304.

FIG. 4 shows a side view schematic of a second embodiment of a wave surge attenuator 400 (such as wave surge attenuator 202 shown in FIGS. 2A-2B) comprised of a vertical section 402, a horizontal section 404, and a hinge element 406 that couples vertical section 402 to horizontal section 404. The vertical section 402 and horizontal section 403 may be the same or similar to the vertical and horizontal sections of wage surge attenuator 300 depicted in FIGS. 3A-3C but with a hinged instead of rigid interface between the vertical and horizontal sections. An axis system 401 depicts a horizontal direction 403 and vertical direction 405 for reference. In one example, hinge element 406 may be a torsional spring wherein vertical section 402 is held stationary via an attachment surface (such as attachment surface 302 shown in FIGS. 3A-3C) and horizontal section 404 is adapted to pivot in the direction indicated by arrow 408 relative to vertical section 402 via hinge element 406.

FIGS. 5A and 5B depict further embodiments of a wave surge attenuator 502 (which may be wave surge attenuator 202 shown in FIGS. 2A-2B) positioned in a fuel tank 504 and coupled to an inner top surface 508 (such as top surface 206 shown in FIGS. 2A-2B) of fuel tank 504 via a plurality of attachment surfaces 506 (which may be similar to attachment surface 203 shown in FIGS. 2A-2B). An axis system 501 depicts the horizontal direction 503 and vertical direction 505 for reference. Wave surge attenuator 502 includes a horizontal section 509 including a base 508 and a set of legs (e.g., cylinders or protrusions) 510 extending outward (vertically upward in the vertical direction 505) from a top surface of the base 508. The base of the horizontal section 509 is arranged parallel to attachment surfaces 506 and perpendicular to a vertical section 511. The vertical section 511 is arranged between the base 508 and attachment surfaces 506. The vertical section 511 includes a set of cylinders 512.

As shown in FIGS. 5A and 5B, the set of cylinders 512 are attached at a first end 514 to attachment surfaces 506 and a second end 516 of cylinders 512 include openings. In this way, the cylinders 512 may be relatively hollow cylinders. The legs 510 extend at a first end 518 from a top surface 522 of base 508. At a second end 520, the legs 510 are surrounded by the second end 516 of the cylinders 512. The horizontal section 509, including the legs 510, is adapted to move vertically (e.g. slide) in the vertical direction 505, as indicated by arrow 524 through the openings of the second ends 516 of cylinders 512 and within cylinders 512.

FIG. 5A shows one example of wave surge attenuator 502 including horizontal section 509 where the set of legs 510 are adapted to slide within the set of cylinders 512 and the cylinders 512 include pressurized air 526 that interface with the second ends 520 of the legs 510. In this way, the pressurized air 526 inside the cylinders 512 may act as a resistive element and control the movement of legs 510 within cylinders 512. In a second example, FIG. 5B illustrates wave surge attenuator 502 similarly comprised of horizontal section 509 where legs 510 are adapted to slide within cylinders 512 and cylinders 512 may include spring elements (such as springs) 528 that interface with the second ends 520 of legs 510. In this way, the spring elements 528 inside the cylinders 512 may act as resistive elements and control the movement of legs 510 within cylinders 512.

Further embodiments of a wave surge attenuator arranged in a fuel tank, such as wave surge attenuator 300 of FIGS. 3A-3C, 400 of FIG. 4, and 502 of FIGS. 5A-5B include different geometrical arrangements of the horizontal and vertical sections, as shown in FIG. 7. For example, in one embodiment, as shown at 702, a vertical section 707 is aligned in a vertical direction 705, as given in by axis system 701 and a horizontal section 704 of the wave surge attenuator may be planar (e.g. flat) in a horizontal direction 703, given by axis system 701. In another embodiment, as shown at 706, a horizontal section 708 of the wave surge attenuator may be curved in the horizontal direction 703 wherein a line tangent to a peak of the curve of horizontal section 708 is perpendicular to the vertical section 707. In some examples, as shown at 710, a first portion of a horizontal section 712, relative to the vertical section 707, may be planar and angled relative to a second side of the horizontal section 713, wherein the angle of tilt 714 is less than or equal to 30 degrees. In yet another embodiment, as shown at 716, the entire horizontal section 718 may be planar but angled relative to the horizontal direction 703 and the vertical section 708, wherein the angle of tilt 720 is less than or equal to 30 degrees.

FIGS. 6A and 6B show an example fuel tank 600 which may be fuel tank 144 shown in FIG. 1 or fuel tank 200 shown in FIGS. 2A-2B. Fuel tank 600 includes a wave surge attenuator 602 and fuel having a fuel surface (e.g., upper fuel surface or level) 604. An axis system 606 is given for reference and depicts the horizontal direction 612, vertical direction 608 and lateral direction 610. The fuel surface 604 represents the height of the fuel in fuel tank 600 in vertical direction 608 relative to a bottom surface 614 of fuel tank 600. Wave surge attenuator 602 is arranged between fuel surface 604 and a top surface 616 of fuel tank 600 and includes an attachment surface 618 that is planar and in face-sharing contact with the top surface 616 of fuel tank 600. Attachment surface 618 is parallel, in the plane formed by lateral direction 610 and horizontal direction 612, with top surface 616 and includes a plurality of apertures 620 adapted to couple attachment surface 618 to the top surface 616 of fuel tank 600.

As shown in FIGS. 6A and 6B, a vertical section 603 is coupled to attachment surface 618 that includes a set of cylinders 622 attached at a first end 623 to attachment surface 618. The set of cylinders 622 is aligned along the lateral direction 610 and arranged perpendicular, in the vertical direction 608, to attachment surface 618, top surface 616, and bottom surface 614 of fuel tank 600. A second end 625 of the cylinders 622 include openings and in this way, the cylinders 622 may be relatively hollow cylinders.

A horizontal section 605 includes a horizontal surface 630, parallel to the plane formed by horizontal direction 612 and lateral direction 610, to which a first end 628 of a set of legs 624 are attached. The set of legs 624 are adapted to slide in the vertical direction 608 at a second end 626 into the second end 625 of the cylinders 622. The cylinders 622 may include pressurized air (such as the pressurized air 526 in FIG. 5A) or springs (such as the spring elements 528 in FIG. 5B). In this way, the pressurized air or springs inside the set of cylinders 622 may act as a resistive element and control the movement of the legs 624 within the cylinders 622. Horizontal section 605 and the legs 624 are adapted to move as a single unit in the vertical direction of 608 wherein the distance between attachment surface 618 and horizontal surface 630, herein described as the height of wave attenuator 602, may be varied by the level in the vertical direction 608 of fuel surface 604.

A bottom surface 627 of horizontal section 605 may be in face-sharing contact with fuel surface 604 and a height 632 (as seen in FIG. 6A) and height 650 (as seen in FIG. 6B) of wave surge attenuator 602, may be adjusted due to such contact. FIG. 6A illustrates an example wherein wave surge attenuator 602 is positioned closer to a first edge 636 of fuel surface 604 than to a second edge 638 of fuel surface 604 in the horizontal direction 612. The first edge 636 of fuel surface 604 has a level 640, wherein the level may be described as the distance in the vertical direction 608 between the bottom surface 614 of fuel tank 600 and the fuel surface 604, that is approximately equal to a level 642 of a second edge 638 of fuel surface 604. A distance 634, between bottom surface 627 of horizontal section 605 and the bottom surface 614 of fuel tank 600 in the vertical direction 608, is also approximately equal to the levels 640 and 642 of the first and second edges, 636 and 638, of fuel surface 704.

In another example, the height 632 of wave surge attenuator 602 may reach a maximum limit when horizontal section 605 including the second set of cylinders 624 slides in the vertical direction 608 down and away from the top surface 616 of fuel tank 600. The maximum height 632 (e.g., fully extended height) may be determined by the extent to which the horizontal section 605 and set of legs 624 may slide down with the second end 626 of the legs 624 remaining in contact and surrounded by the second end 625 of the cylinders 622. In this way, when levels 640 and 642 are lower in the vertical direction 208 than the distance 634 when the height 632 of wave surge attenuator 602 is at the maximum limit, bottom surface 627 of horizontal section 605 will no longer be in face-sharing contact with fuel surface 604.

In yet another example, fuel tank 600 in FIG. 6B may include fuel surface 604 wherein a level 644 of the first edge 636 of fuel surface 604 is greater than a level 646 of the second edge 638 of fuel surface 604. This may occur when a vehicle, such as vehicle 201 in FIGS. 2A-2B, experiences conditions that lead to wave motion in fuel tank 600 while navigating terrain. Wave surge attenuator 602 is positioned closer to a first edge 636 of fuel surface 604 than to a second edge 638 of fuel surface 604 in the horizontal direction 612. A distance 648, between the bottom surface 627 of horizontal section 605, is approximately equal to the level 644 of the first edge 636 and greater than the level 642 of the second edge 638 of fuel surface 604. The level 644 of the first edge 636 of fuel surface 604 in FIG. 6B may also be greater than the level 640 of the first edge 636 of fuel surface 604 in FIG. 6A while the level 646 of the second edge 638 of fuel surface 604 in FIG. 6B may be lower than the level 642 of the second edge 638 of fuel surface 604 in FIG. 6A.

In addition, the distance 648 between the bottom surface 627 of horizontal section 605 and the bottom surface 614 of fuel tank 600 in FIG. 6B may be larger than the distance 634 of the bottom surface 627 of horizontal section 605 in FIG. 6A. As well, the height 650 of wave surge attenuator 602 in FIG. 6A is smaller in the vertical direction 608 than the height 632 of wave surge attenuator in FIG. 6B. In this way, changes in the vertical direction 608 in the level of fuel surface 604, such as the increase in level 644 of the first edge 636 of fuel surface 604 in FIG. 6B compared to level 640 in FIG. 6A, adjusts the height of wave surge attenuator 602 via face-sharing contact between bottom surface 627 of horizontal section 605 and fuel surface 604. A greater length in the vertical direction 608 of the legs 624 are inserted into the cylinders 622 in FIG. 6B versus FIG. 6A. This adjustment of height of wave surge attenuator 602 enables constant face-sharing contact and suppression of amplitude in fuel slosh waves generated within fuel tank 600 as long as the fuel surface level is not lower in the vertical direction 608 than the distance between the bottom surface 627 of horizontal section 605 when the height of wave surge attenuator 602 is at a maximum.

In this way, a wave surge attenuator positioned in a fuel tank of a vehicle may be used to address problems from fuel slosh and associated noises in hybrid and start-stop vehicles. The wave surge attenuator may include a system of baffles including a top attachment, a vertical section, and a horizontal section where the top attachment includes a plurality of apertures to attach the top attachment to a top surface, i.e. ceiling, of a fuel tank. The top attachment is arranged perpendicular to the vertical section and coupled to a first end of the vertical section and a second end of the vertical section is coupled to the horizontal section which is positioned perpendicular to the vertical section and parallel to the top attachment. The vertical section extends across the length of the horizontal section and may include a plurality of apertures of a plurality of cylinders. The horizontal section is positioned vertically above and spaced away from the bottom surface of the fuel tank and may be rigidly mated to the vertical section or coupled via a hinged element or a plurality of cylinders adapted to allow the horizontal section to slide vertically as adjusted by face-sharing contact with the fuel surface. The technical effect of having a fuel tank wave surge attenuator that includes a horizontal section and a vertical section is minimizing fuel oscillations in both the vertical and horizontal directions by retarding wave motions and thereby dampening collisions between the fuel and inner walls and ceiling of the fuel tank. By mitigating fuel slosh, noise is suppressed and the fatigue life of the fuel tank may also be increased.

As one embodiment, a baffle system for a fuel tank includes: a horizontal section; a vertical section arranged perpendicular to the horizontal section and including a first end coupled to the horizontal section, the vertical section extending across a length of the horizontal section; and an attachment surface coupled to a second end of the vertical section and including a plurality if apertures adapted to couple the baffle system to a top surface of the fuel tank. In a first example of the baffle system, the first end of the vertical section is coupled to a top surface of the horizontal section and centered along a width of the horizontal section, the width arranged perpendicular to the length, wherein the horizontal section includes a central aperture, and wherein the vertical section extends over and across the central aperture, in a direction of the length. A second example of the baffle system optionally includes the first example, and further includes, wherein the vertical section wherein the vertical section includes a plurality of apertures extending through a wall of the vertical section. A third example of the baffle system optionally includes one or more of the first and second examples, and further includes, wherein the plurality of apertures are arranged at outer ends of the vertical section, a first set of apertures of the plurality of apertures arranged at a first outer end of the vertical section and a second set of apertures of the plurality of apertures arranged at a second outer end of the vertical section, the first set of apertures separated from the second set of apertures by a central portion of the wall of the vertical section. A fourth example of the baffle system optionally includes one or more of the first through third examples, and further includes, wherein the first set of apertures are stacked above and below one another between the first end and second end of the vertical section. A fifth example of the baffle system optionally includes one or more of the first through fourth examples, and further includes, a plurality of ribs extending across each of the horizontal section and vertical section and between the horizontal section and vertical section. A sixth example of the baffle system optionally includes one or more of the first through fifth examples, and further includes, wherein the plurality of ribs includes a first set of ribs extending from a first surface of the vertical section to a first surface of the horizontal section and a second set or ribs extending from a second surface of the vertical section to a second surface of the horizontal section, where the first surface and second surface of the vertical section are arranged on opposite sides of the vertical section from one another and the first surface and second surface of the horizontal section are part of a same, top surface of the horizontal section and separated from one another by the vertical section. A seventh example of the baffle system optionally includes one or more of the first through sixth examples, and further includes, wherein each rib of the plurality of ribs is thickest at a mating interface between the horizontal section and the vertical section. A eighth example of the baffle system optionally includes one or more of the first through seventh examples, and further includes, wherein the horizontal section and vertical section are rigidly coupled to one another and formed as one piece and wherein each of the horizontal section and the vertical section are planar. A ninth example of the baffle system optionally includes one or more of the first through eighth examples, and further includes, wherein the first end of the vertical section is coupled to the horizontal section via a hinged element, wherein the vertical section is held stationary via the attachment surface, and wherein the horizontal section is adapted to pivot relative to the vertical section via the hinged element. An tenth example of the baffle system optionally includes one or more of the first through ninth examples, and further includes, wherein the vertical section includes a set of cylinders and the horizontal section includes a set of legs extending from a top surface of a base of the horizontal section, where each cylinder of the set of cylinders surrounds one leg of the set of legs, and wherein the set of legs are adapted to move vertically within the set of cylinders. An eleventh example of the baffle system optionally includes one or more of the first through tenth examples, and further includes, wherein each cylinder of the set of cylinders includes a spring element that interfaces with each leg of the set of legs. A twelfth example of the baffle system optionally includes one or more of the first through tenth examples, and further includes, wherein each cylinder of the set of cylinders includes pressurized air that interfaces with each leg of the set of legs. A thirteenth example of the baffle system optionally includes one or more of the first through twelfth examples, and further includes, wherein the vertical section is planar and the horizontal section is curved, where a line tangent to a peak of the curve of the horizontal section is perpendicular to the vertical section. A fourteenth example of the baffle system optionally includes one or more of the first through thirteenth examples, and further includes, wherein a first portion of the horizontal section is planar and arranged perpendicular to the vertical section and wherein a second portion of the horizontal sections is planar and angled relative to the vertical section.

As another embodiment, a system includes: a fuel tank including a top surface arranged opposite a bottom surface; and a baffle system positioned within the fuel tank, the baffle system including: a vertical section rigidly coupled to the top surface at a first end of the vertical section and arranged perpendicular to the top and bottom surfaces; a horizontal section coupled to a second end of the vertical section and arranged parallel to the top and bottom surfaces. In a first example of the system, wherein the vertical section is rigidly coupled to the top surface of the fuel tank via an attachment surface, the attachment surface including a planar surface arranged parallel to the top surface and directly coupled to the top surface via a plurality of mounting apertures in the planar surface and a plurality of legs extending from the planar surface and directly coupled to side surfaces arranged on either side of the vertical section. A second example of the system optionally includes the first example, and further includes, wherein the baffle system has a baffle height defined by a height of the vertical section, the baffle height defined perpendicular to the top surface and by an amount that arranges the horizontal section in a range of 70 to 90% of a total height of the fuel tank, the total height of the fuel tank defined from the bottom surface to the top surface. A third example of the system optionally includes one or more of the first and second examples, and further includes, wherein the baffle system has a baffle height defined perpendicular to the top surface and between a bottom of a planar surface of the horizontal section and the first end of the vertical section, wherein the horizontal section includes a plurality of vertical legs extending from the planar surface toward the top surface of the fuel tank, wherein the vertical section includes a plurality of hollow cylinders, where each cylinder of the plurality of hollow cylinders surrounds one leg of the plurality of legs, and wherein the plurality of legs are adapted to move vertically within the plurality of cylinders to adjust the baffle height and a distance between the planar surface and the top surface of the fuel tank.

In yet another embodiment, a vehicle comprises: a fuel tank including a top surface and a bottom surface, the top surface arranged vertically above the bottom surface relative to a ground on which the vehicle sits; and a baffle system positioned within the fuel tank, the baffle system including: a vertical section having a top end directly coupled to the top surface of the fuel tank via an attachment surface of the baffle system, the vertical section arranged perpendicular to the top and bottom surfaces; and a horizontal section coupled to a bottom end of the vertical section, the bottom end arranged opposite the top end, and arranged parallel to the top and bottom surfaces, the horizontal section spaced away from the bottom surface. In a first example of the vehicle, wherein the horizontal section is positioned vertically above a 50% fill level of the fuel tank, where the 50% fill level is positioned between the top and bottom surfaces. A second example of the vehicle optionally includes the first example, and further includes, wherein the horizontal section includes a central aperture positioned directly and vertically below the attachment surface, and wherein the central aperture is at least as wide as the attachment surface which includes a plurality of holes for fastening the attachment surface to the top surface of the fuel tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a fuel tank including a top surface arranged opposite a bottom surface; and
a baffle system positioned within the fuel tank, the baffle system including:
a vertical section rigidly coupled to the top surface at a first end of the vertical section and arranged perpendicular to the top and bottom surfaces;
a horizontal section coupled to a second end of the vertical section and arranged parallel to the top and bottom surfaces,
wherein the vertical section is rigidly coupled to the top surface of the fuel tank via an attachment surface, the attachment surface including a planar surface arranged parallel to the top surface and directly coupled to the top surface via a plurality of mounting apertures in the planar surface.

2. The system of claim 1, wherein the planar surface is coupled to the top surface via a plurality of legs extending from the planar surface and directly coupled to side surfaces arranged on either side of the vertical section.

3. The system of claim 1, wherein the baffle system has a baffle height defined by a height of the vertical section, the baffle height defined perpendicular to the top surface and by an amount that arranges the horizontal section in a range of 70 to 90% of a total height of the fuel tank, the total height of the fuel tank defined from the bottom surface to the top surface.

4. The system of claim 1, wherein the baffle system has a baffle height defined perpendicular to the top surface and between a bottom of a planar surface of the horizontal section and the first end of the vertical section, wherein the horizontal section includes a plurality of vertical legs extending from the planar surface toward the top surface of the fuel tank, wherein the vertical section includes a plurality of hollow cylinders, where each cylinder of the plurality of hollow cylinders surrounds one leg of the plurality of legs, and wherein the plurality of legs is adapted to move vertically within the plurality of cylinders to adjust the baffle height and a distance between the planar surface and the top surface of the fuel tank.

5. A vehicle, comprising:
a fuel tank including a top surface and a bottom surface, the top surface arranged vertically above the bottom surface relative to a ground on which the vehicle sits; and
a baffle system positioned within the fuel tank, the baffle system including:
a vertical section having a top end directly coupled to the top surface of the fuel tank via an attachment surface of the baffle system, the vertical section arranged perpendicular to the top and bottom surfaces;
a horizontal section coupled to a bottom end of the vertical section, the bottom end arranged opposite the top end, and arranged parallel to the top and bottom surfaces, the horizontal section spaced away from the bottom surface; and
a plurality of ribs extending across each surface of the horizontal section and the vertical section.

6. The vehicle of claim 5, wherein the horizontal section is positioned vertically above a 50% fill level of the fuel tank, where the 50% fill level is positioned between the top and bottom surfaces.

7. The vehicle of claim 5, wherein the horizontal section includes a central aperture positioned directly and vertically below the attachment surface, and wherein the central aperture is at least as wide as the attachment surface which includes a plurality of apertures for fastening the attachment surface to the top surface of the fuel tank.

8. The vehicle of claim 5, wherein the vertical section extends across a length of the horizontal section.

9. The vehicle of claim 7, wherein the vertical section extends over and across the central aperture, in a direction of the length.

10. The vehicle of claim 5, wherein the vertical section includes a plurality of apertures extending through a wall of the vertical section.

11. The vehicle of claim 10, wherein the plurality of apertures is arranged at outer ends of the vertical section, a first set of apertures of the plurality of apertures arranged at a first outer end of the vertical section and a second set of apertures of the plurality of apertures arranged at a second outer end of the vertical section, the first set of apertures separated from the second set of apertures by a central portion of the wall of the vertical section.

12. The vehicle of claim 11, wherein the first set of apertures is stacked above and below one another between the top end and the bottom end of the vertical section.

13. The vehicle of claim 5, wherein the plurality of ribs extends between the horizontal section and the vertical section.

14. The vehicle of claim 5, wherein the horizontal section and the vertical section are rigidly coupled to one another and formed as one piece, and wherein each of the horizontal section and the vertical section are planar.

15. The vehicle of claim 5, wherein the top end of the vertical section is coupled to the horizontal section via a hinged element, wherein the vertical section is held stationary via the attachment surface, and wherein the horizontal section is adapted to pivot relative to the vertical section via the hinged element.

16. The vehicle of claim 5, wherein the vertical section includes a set of cylinders and the horizontal section includes a set of legs extending from a top surface of a base of the horizontal section, where each cylinder of the set of cylinders surrounds one leg of the set of legs, and wherein the set of legs is adapted to move vertically within the set of cylinders.

17. The vehicle of claim 16, wherein each cylinder of the set of cylinders includes a spring element that interfaces with each leg of the set of legs.

18. The vehicle of claim 16, wherein each cylinder of the set of cylinders includes pressurized air that interfaces with each leg of the set of legs.

19. The vehicle of claim 5, wherein the vertical section is planar and the horizontal section is curved, where a line tangent to a peak of a curve of the horizontal section is perpendicular to the vertical section.

20. The vehicle of claim 5, wherein a first portion of the horizontal section is planar and arranged perpendicular to the vertical section and wherein a second portion of the horizontal section is planar and angled relative to the vertical section.

* * * * *